United States Patent
Carrel et al.

(10) Patent No.: US 7,269,182 B1
(45) Date of Patent: Sep. 11, 2007

(54) METHOD AND APPARATUS FOR PPPOE MULTICAST

(75) Inventors: David M. Carrel, Belvedere, CA (US); Che-Lin Ho, Zephyr Cove, NV (US); Thomas M. Stoner, Raleigh, NC (US); Michael D. Tracy, Foster City, CA (US)

(73) Assignee: Redback Networks Inc., San Jose, CA (US)

( * ) Notice: Subject to any disclaimer, the term of this patent is extended or adjusted under 35 U.S.C. 154(b) by 949 days.

(21) Appl. No.: 10/035,506

(22) Filed: Oct. 22, 2001

(51) Int. Cl.
*H04J 3/26* (2006.01)

(52) U.S. Cl. .................. 370/432; 370/466; 370/390

(58) Field of Classification Search .............. 370/432, 370/466, 390
See application file for complete search history.

(56) References Cited

U.S. PATENT DOCUMENTS

| | | | | |
|---|---|---|---|---|
| 6,118,785 | A * | 9/2000 | Araujo et al. | 370/401 |
| 6,891,825 | B1 * | 5/2005 | O'Dell et al. | 370/352 |
| 6,977,906 | B2 * | 12/2005 | Owens et al. | 370/252 |
| 2004/0240466 | A1 * | 12/2004 | Unitt et al. | 370/461 |

OTHER PUBLICATIONS

Simon Walton et al., Pratical Multicasting on a Nonbroadcast Subnetwork, 1997, IEEE, pp. 251-258.*
S. Keshav, An Engineering Approach to Computer Networking ATM Networks, the Internet, and the Telephone Network, Addison-Wesley, Apr. 1997, pp. 15, 16, 498-502.
David Carrel, Dan Simone, Che-Lin Ho, and Thomas Stoner, Extensions to a Method for Transmitting PPP Over Ethernet, community.roxen.com, May 2000.
You Song, IP Multicasting and Broadcasting for PPPoE Protocol, Network Working Group, Internet Draft, Aug. 2001.
Internet Enforcement Task Force, "Internet-Drafts Database interface" <https://datatracker.ietf.org/public/idindex.cgi?command=show_list&cat=dead&sort=date>, p. 101 of 208.

* cited by examiner

*Primary Examiner*—Huy D. Vu
*Assistant Examiner*—Jason Mattis
(74) *Attorney, Agent, or Firm*—Blakely, Sokoloff, Taylor & Zafman, LLP

(57) ABSTRACT

A method and apparatus for PPPoE multicast is described. A computer implemented method comprises determining a PPPoE client to be multicast capable, determining a layer 2 multicast channel from a layer 3 multicast channel, and transmitting multicast traffic for the layer 2 multicast channel as PPPoE multicast traffic in a PPPoE multicast session to the PPPoE client.

36 Claims, 8 Drawing Sheets

METHOD AND APPARATUS FOR PPPOE MULTICAST

BACKGROUND OF THE INVENTION

1. Field of the Invention

The invention relates to the field of communication. More specifically, the invention relates to communication networks.

2. Background of the Invention

Broadband access is available with a variety of technologies including wireless, cable, and DSL. A variety of network services have emerged in conjunction with the growth and advancement of broadband access. These services include video-conferencing, VoIP, video feeds, gaming services, etc. Delivery of these services and the end-user experience to access these services were enhanced by the Point to Point Protocol over Ethernet (PPPoE).

Point to Point Protocol over Ethernet (PPPoE) was developed to meet several goals. One goal was to provide the end-user a familiar dial-up style interface. Another goal was to connect multiple hosts at a remote site through the same customer premise equipment (CPE) ("A Method for Transmitting PPP over Ethernet", RFC 2516, 1999). PPPoE also satisfied the goal of introducing access control and billing functionality, which is inherent to PPP, to broadband access technology ("A Method for Transmitting PPP over Ethernet", RFC 2516, 1999).

Unfortunately, PPPoE does not support multicasting. Multicast traffic can be transmitted to hosts with support for PPPoE ("PPPoE clients"), but inefficiently.

FIG. 1 (Prior Art) is a diagram of a network carrying multicast traffic to hosts. In FIG. 1, hosts 101, 103, and 105 have respectively established PPPoE sessions 121, 123, and 125 with an access concentrator 111. The hosts 101, 103, and 105 are connected to a customer premise equipment (CPE) 107 (e.g., a DSL modem, a cable modem, etc.). The CPE 107 is connected to a regional data network cloud 109 with a link 115. The regional data network cloud 109 is connected to the access concentrator 111 with a link 117.

A server 113 transmits multicast traffic 127 to the access concentrator 111 over a link 119. The access concentrator 111 transmits the multicast traffic 127 to each participating host with PPPoE unicast sessions 121, 123, and 125 (i.e., three instances of the multicast traffic 127 are transmitted in the links 115 and 117). The CPE 107 receives the three unicasts of the multicast traffic 127 for the PPPoE unicast sessions 121, 123 and 125 and broadcasts the unicasts of the multicast traffic 127 for each PPPoE unicast session 121, 123, and 125.

FIG. 2 (Prior Art) is a flowchart for receiving multicast traffic. At block 201, the host 101 transmits a PPPoE active discovery request (PADR) to the access concentrator 111. At block 202, a PPPoE unicast session is established between the access concentrator 111 and the host 101. At block 203, the host 101 receives notification of an Internet Protocol (IP) multicast channel. At block 205, the host 101 listens for traffic on the IP multicast channel. At block 207, a unicast PPPoE process on the host 101 receives a PPPoE encapsulated IP multicast packet. At block 209, the unicast PPPoE process on the host 101 decapsulates the IP multicast packet from PPPoE. At block 211, the unicast PPPoE process passes the decapsulated IP multicast packet to an IP process on the host 101. At block 211, the IP process determines if the host 101 is listening to the IP multicast channel indicated in the IP multicast packet. If the host is not listening to the indicated IP multicast channel, then the IP process discards the IP multicast packet at block 215. If the host 101 is listening to the indicated IP multicast channel, then the IP process decapsulates the IP multicast packet from IP encapsulation. At block 219, the host 101 processes the multicast packet.

FIG. 3 (Prior Art) is a flowchart for transmitting multicast traffic to PPPoE clients from an access concentrator. At block 301, the access concentrator 111 receives notification of an IP multicast channel. At block 305, the access concentrator 111 notifies the hosts 101, 103 and 105 of the IP multicast channel. At block 307, the access concentrator 111 receives an IP multicast packet. At block 309, the access concentrator 111 generates IP multicast packets for each of the established PPPoE unicast sessions 121, 123, and 125 that is participating in the IP multicast channel. In this example, all of the hosts 101, 103, and 105 are participating in the IP multicast channel. At block 311, the access concentrator 111 encapsulates the generated IP multicast packets with PPPoE. Each IP multicast packet's PPPoE encapsulation includes an identifier for the corresponding PPPoE unicast sessions 121, 123, or 125. Each of the generated IP multicast packets also include an identifier for the unicast Ethernet address of the corresponding one of the hosts 101, 103, and 105. The access concentrator 111 can additionally encapsulates the PPPoE encapsulated IP multicast packets with a delivery protocol (e.g., ATM). At block 315, the access concentrator 111 transmits the encapsulated IP multicast packets (one per each participating PPPoE unicast session).

Transmitting IP multicast packets to PPPoE clients uses bandwidth inefficiently. In addition, the PPPoE client expends processing power at lower layers on IP multicast packets that will be discarded at a higher layer. Furthermore, an access concentrator expends valuable resources generating and transmitting copies of multicast traffic for established PPPoE unicast sessions.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE DRAWINGS

In the following description, numerous specific details are set forth to provide a thorough understanding of the invention. However, it is understood that the invention may be practiced without these specific details. In other instances, well-known circuits, structures, standard, and techniques have not been shown in detail in order not to obscure the invention.

Figure 1:
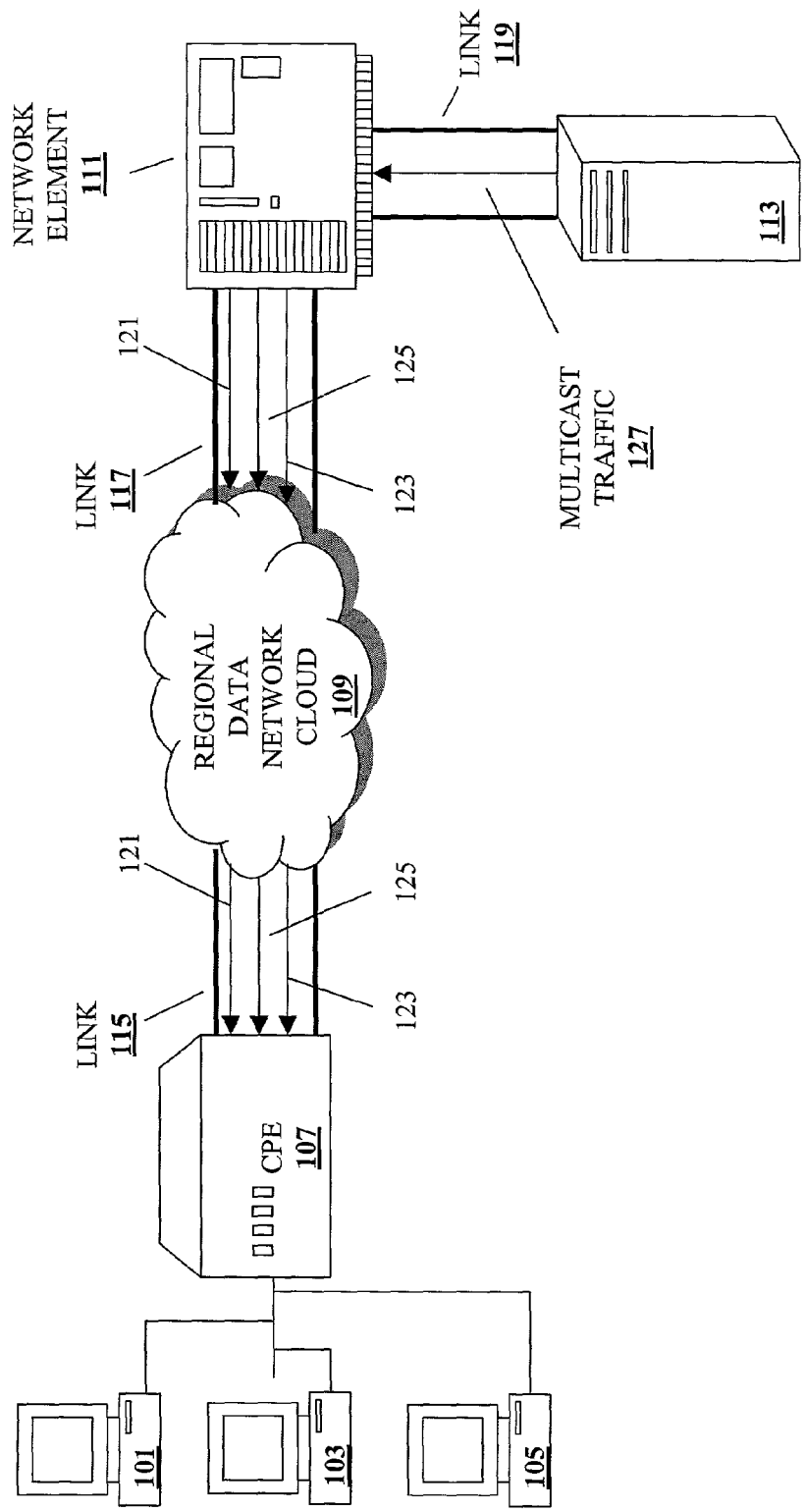
FIG. 1 (Prior Art) is a diagram of a network carrying multicast traffic to hosts.
Figure 2:
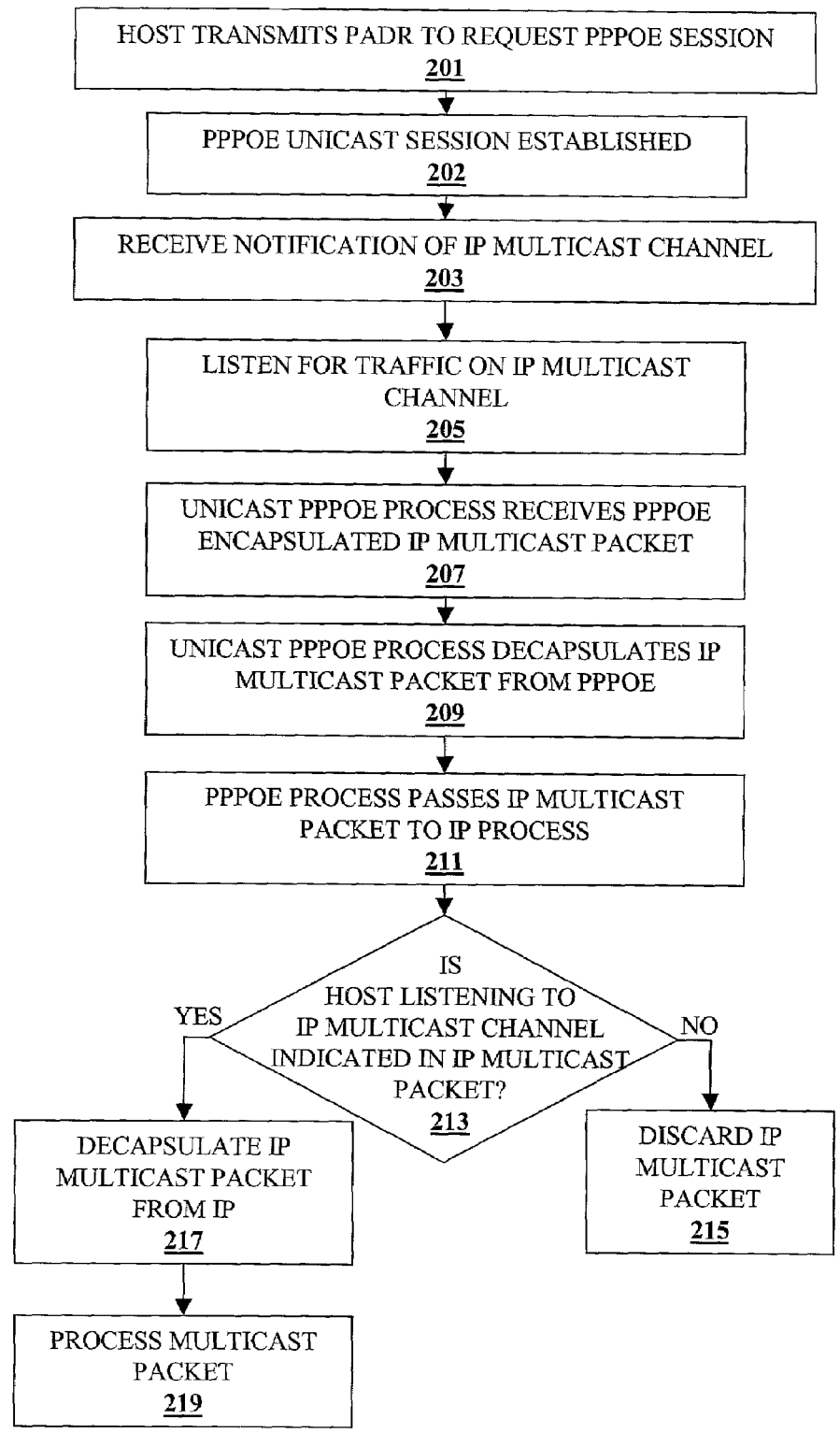
FIG. 2 (Prior Art) is a flowchart for receiving multicast traffic.
Figure 3:
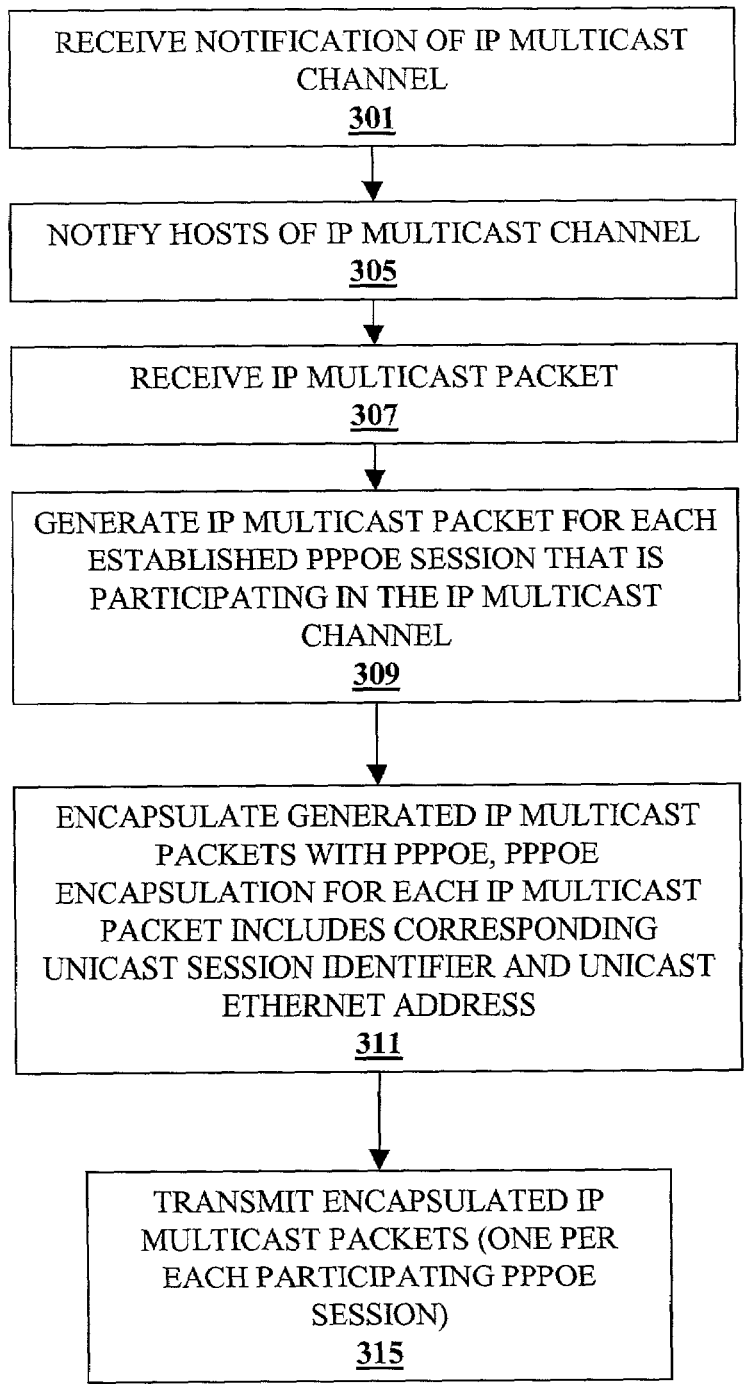
FIG. 3 (Prior Art) is a flowchart for transmitting multicast traffic to PPPoE clients from an access concentrator.
Figure 4:
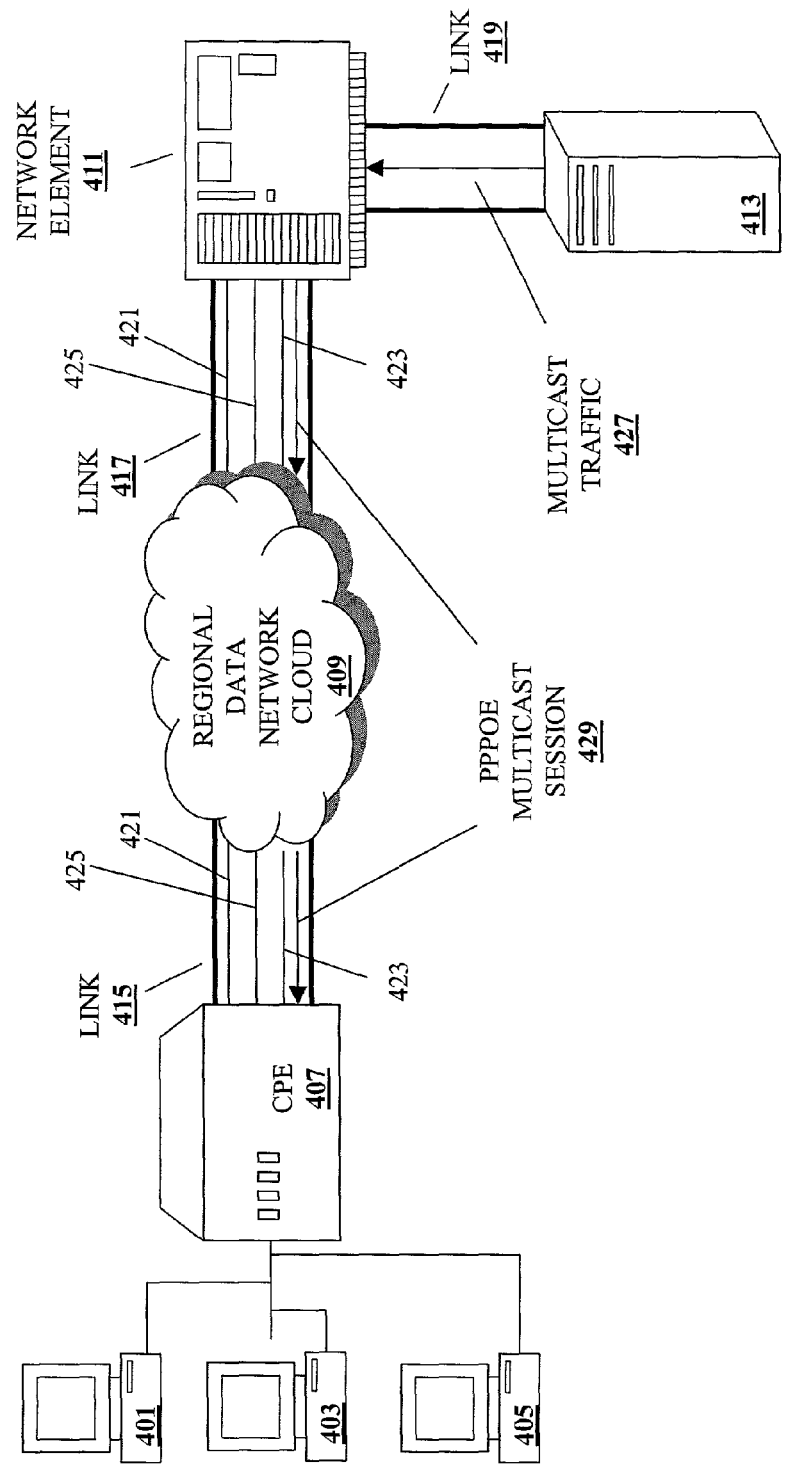
FIG. 4 is a block diagram illustrating support of multicasting with PPPoE according to one embodiment of the invention.

FIG. 4 is a block diagram illustrating support of multicasting with PPPoE according to one embodiment of the invention. In FIG. 4, hosts 401, 403, and 405 are coupled with a customer premise equipment (CPE) 407 (e.g., cable modem, DSL modem, etc.). The CPE 407 is coupled with a regional data network cloud 409 with a link 415. The regional data network cloud 409 is coupled with a network element 411 with a link 417. The network element 411 is coupled with a server 413 with a link 419. The hosts 401, 403, and 405 have respectively established PPPoE sessions 421, 423 and 425 with the network element 411.

The server 413 originates multicast traffic 427 (e.g., a video stream, audio stream, collaborative applications, sharing whiteboards, etc.). The server 413 transmits the multicast traffic 427 to the network element 411 via the link 419. The network element 411 transmits the multicast traffic 427 as a PPPoE multicast session 429 to the CPE 407. The CPE 407 transmits the multicast traffic to the hosts 401, 403, and 405 using an Ethernet multicast address.

As shown in FIG. 4, the multicast traffic 427 is transmitted to the three hosts 427 without consuming extra bandwidth. The PPPoE multicast session 429 consumes an amount of bandwidth of the links 415 and 417 necessary for a single instance of the multicast traffic 427. The PPPoE sessions 421, 423, and 425 can either carry additional traffic, or not use any additional bandwidth by remaining idle.

Figure 5:
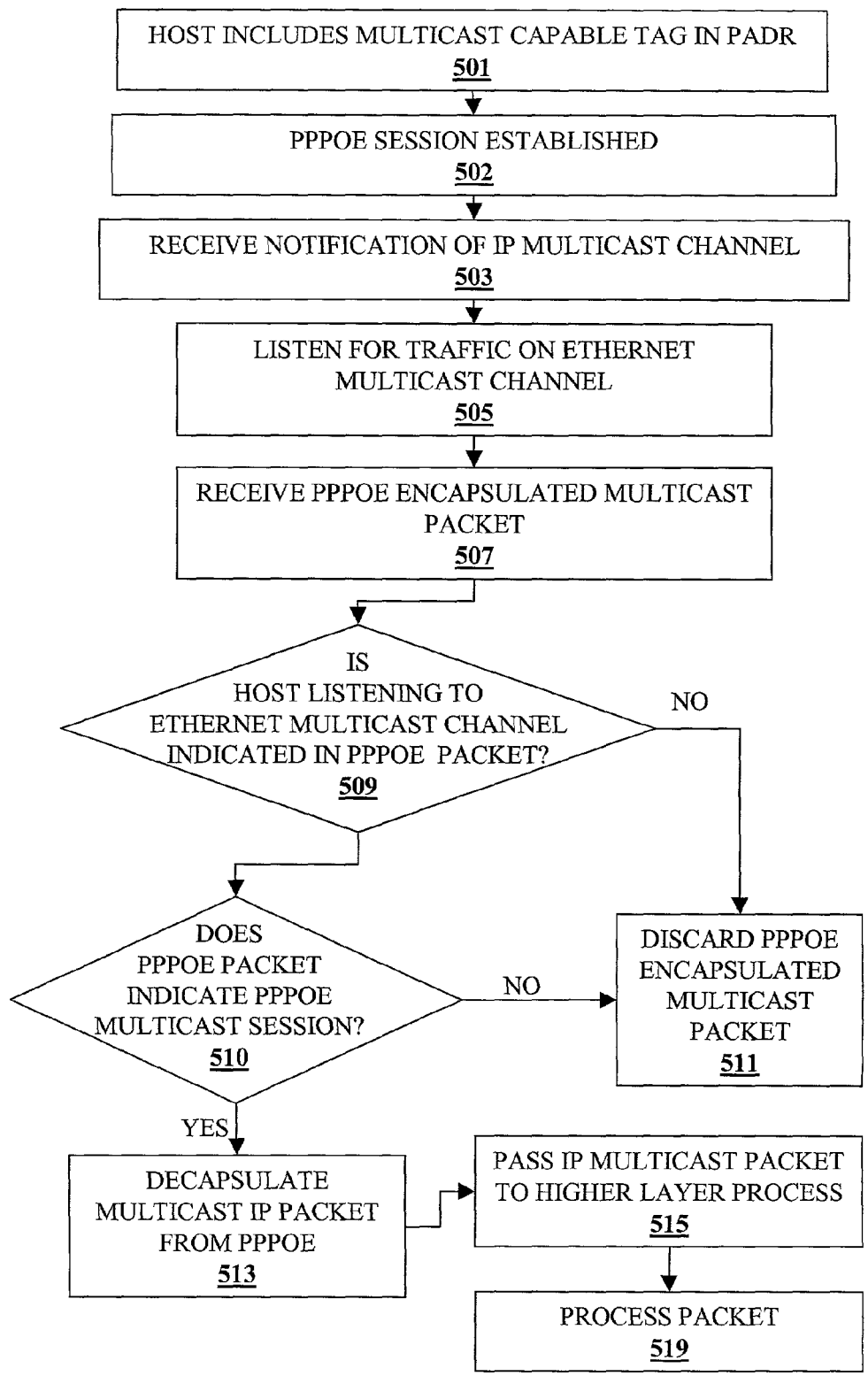
FIG. 5 is a flowchart for the hosts of FIG. 4 to receive the multicast traffic 427 in the PPPoE multicast session 429 according to one embodiment of the invention.

FIG. 5 is a flowchart for the hosts of FIG. 4 to receive the multicast traffic 427 in the PPPoE multicast session 429 according to one embodiment of the invention. FIG. 5 will be described with reference to the host 401 as an example. At block 501, the host 401 includes a PPPoE multicast capable tag in a PADR transmitted to the network element 411. At block 502, the host 401 establishes a PPPoE session with the network element 411. At block 503, the host 401 receives notification of a multicast channel (e.g., a multicast IP address). At block 505, the host 401 listens for multicast traffic on an Ethernet multicast channel. If the multicast channel is an IP multicast address, then the host 401 will listen for multicast traffic by translating the IP multicast address to an Ethernet Media Access Control (MAC) address.

At block 507, the host 401 receives a PPPoE encapsulated multicast packet ("PPPoE packet"). At block 509, a PPPoE module on the host 401 determines if the host is listening to the Ethernet multicast channel that is indicated in the PPPoE packet. If the host 401 determines that the indicated Ethernet multicast channel is not the desired Ethernet multicast channel, then at block 511 the host discards the PPPoE encapsulated multicast packet. If the host 401 determines that the indicated Ethernet multicast channel is the desired Ethernet multicast channel, then at block 510 the PPPoE module determines if the PPPoE packet indicates the PPPoE multicast session. If the PPPoE packet does not indicate the PPPoE multicast session, then control flows to block 511. If the PPPoE packet indicates the PPPoE multicast session, then at block 513 the PPPoE module on the host 401 decapsulates the multicast IP packet from PPPoE. At block 515, the PPPoE module on the host 401 passes the IP multicast packet to a higher layer process (e.g., a layer 3 process such as an IP process). The IP process will decapsulate the multicast packet from IP encapsulation. At block 519, the host processes the packet.

At layer 2 (the OSI reference model layer that approximately corresponds to PPPoE), undesired multicast packets are discarded. Valuable processor time and power of the host 401 are not spent decapsulating and processing a multicast packet that will be discarded. The described invention preserves the host's resources.

Figure 6:
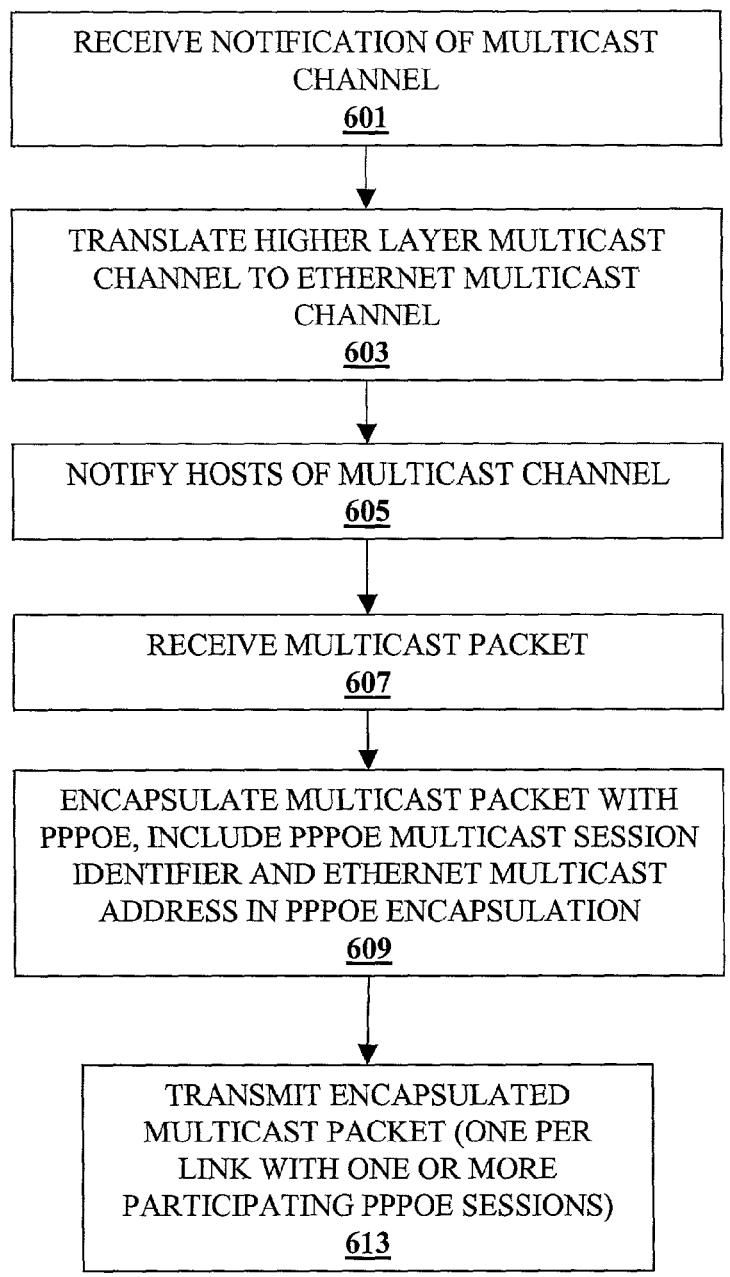
FIG. 6 is a flowchart for transmitting multicast traffic with PPPoE according to one embodiment of the invention.

FIG. 6 is a flowchart for transmitting multicast traffic with PPPoE according to one embodiment of the invention. At block 601, the network element 411 receives notification of a multicast channel. At block 603, the network element 411 translates the multicast channel from a higher layer to Ethernet. For example, if the multicast channel is an IP multicast address, then the network element 411 translates the IP multicast address into an Ethernet MAC address. At block 605, the network element 411 notifies the hosts 401, 403, and 405 of the multicast channel. At block 607, the network element 411 receives a multicast packet.

At block 609, the network element encapsulates the multicast packet with PPPoE and includes two values in the PPPoE encapsulation: 1) a PPPoE multicast session identifier, and 2) the Ethernet MAC address translated from the higher layer address. The host 411 can further encapsulate the PPPoE encapsulated multicast packet with a delivery protocol (e.g., ATM). At block 613, the network element 411 transmits the encapsulated multicast packet (one per link with one or more participating PPPoE sessions).

The described invention saves power and time of the processor on the network element transmitting the multicast traffic with PPPoE. The network element 411 does not expend resources to generate and transmit multiple copies of the received multicast packet for each interested host.

Figure 7:
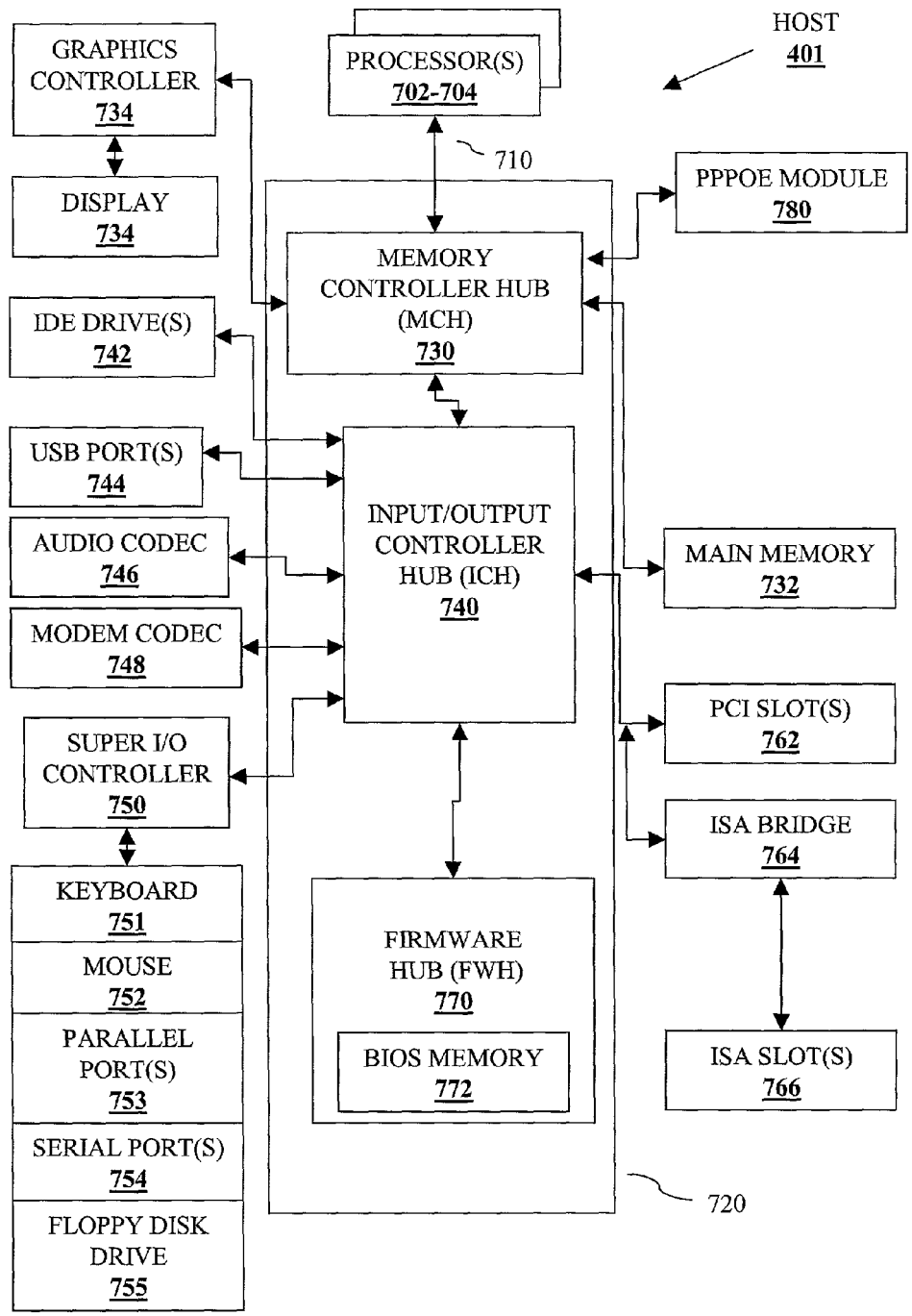
FIG. 7 illustrates the exemplary host 401 comprising processors 702 and 704 for processing PPPoE multicast traffic, according to embodiments of the present invention.

FIG. 7 illustrates the exemplary host 401 comprising processors 702 and 704 for processing PPPoE multicast traffic, according to embodiments of the present invention. Although described in the context of host 401, the present invention may be implemented in any suitable computer system comprising any suitable one or more integrated circuits.

As illustrated in FIG. 7, host 401 comprises processor 702 and processor 704. Host 401 also includes processor bus 710, and chipset 720. Processors 702 and 704 and chipset 720 are coupled to processor bus 710. Host 401 for other embodiments may comprise one, three, or more processors any of which may execute a set of instructions that are in accordance with embodiments of the present invention.

Chipset 720 for one embodiment comprises memory controller hub (MCH) 730, input/output (I/O) controller hub (ICH) 740, and firmware hub (FWH) 770. MCH 730, ICH 740, and FWH 770 may each comprise any suitable circuitry and for one embodiment is each formed as a separate integrated circuit chip. Chipset 720 for other embodiments may comprise any suitable one or more integrated circuit devices.

MCH 730 may comprise any suitable interface controllers to provide for any suitable communication link to processor bus 710 and/or to any suitable device or component in communication with MCH 730. MCH 730 for one embodiment provides suitable arbitration, buffering, and coherency management for each interface.

MCH 730 is coupled to processor bus 710 and provides an interface to processors 702 and 704 over processor bus 710. Processor 702 and/or processor 704 may alternatively be combined with MCH 730 to form a single chip. MCH 730 for one embodiment also provides an interface to a main memory 732 and a graphics controller 734 each coupled to MCH 730. Main memory 732 stores data and/or instructions, for example, for host 401 and may comprise any suitable memory, such as a dynamic random access memory (DRAM) for example. Graphics controller 734 controls the display of information on a suitable display 736, such as a cathode ray tube (CRT) or liquid crystal display (LCD) for example, coupled to graphics controller 734. MCH 730 for one embodiment interfaces with graphics controller 734 through an accelerated graphics port (AGP). Graphics controller 734 for one embodiment may alternatively be combined with MCH 730 to form a single chip.

MCH 730 is also coupled to ICH 740 to provide access to ICH 740 through a hub interface. ICH 740 provides an interface to I/O devices or peripheral components for host 401. ICH 740 may comprise any suitable interface controllers to provide for any suitable communication link to MCH 730 and/or to any suitable device or component in communication with ICH 740. ICH 740 for one embodiment provides suitable arbitration and buffering for each interface.

For one embodiment, ICH 740 provides an interface to one or more suitable integrated drive electronics (IDE) drives 742, such as a hard disk drive (HDD) or compact disc read only memory (CD ROM) drive for example, to store data and/or instructions for example, one or more suitable universal serial bus (USB) devices through one or more USB ports 744, an audio coder/decoder (codec) 746, and a modem codec 748. ICH 740 for one embodiment also provides an interface through a super I/O controller 750 to a keyboard 751, a mouse 752, one or more suitable devices, such as a printer for example, through one or more parallel ports 753, one or more suitable devices through one or more serial ports 754, and a floppy disk drive 755. ICH 740 for one embodiment further provides an interface to one or more suitable peripheral component interconnect (PCI) devices coupled to ICH 740 through one or more PCI slots 762 on a PCI bus and an interface to one or more suitable industry standard architecture (ISA) devices coupled to ICH 740 by the PCI bus through an ISA bridge 764. ISA bridge 764 interfaces with one or more ISA devices through one or more ISA slots 766 on an ISA bus.

ICH 740 is also coupled to FWH 770 to provide an interface to FWH 770. FWH 770 may comprise any suitable interface controller to provide for any suitable communication link to ICH 740. FWH 770 for one embodiment may share at least a portion of the interface between ICH 740 and super I/O controller 750. FWH 770 comprises a basic input/output system (BIOS) memory 772 to store suitable system and/or video BIOS software. BIOS memory 772 may comprise any suitable non-volatile memory, such as a flash memory for example.

Additionally, host 401 includes PPPoE module 780. In an embodiment, PPPoE module 780 can be processes or tasks that can reside within main memory 732 and/or processors 702 and 704 and can be executed within processors 702 and 704. However, embodiments of the present invention are not so limited, as PPPoE module 780 can be different types of hardware (such as digital logic) executing the processing described herein.

Figure 8:
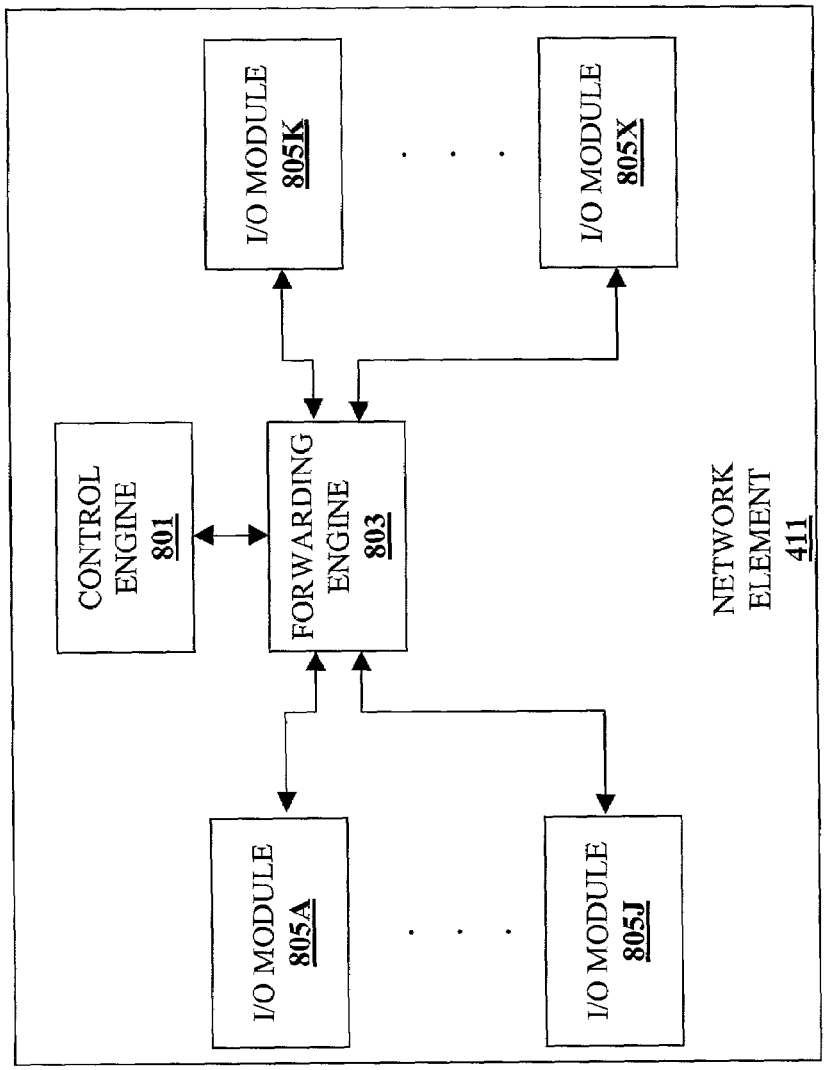
FIG. 8 is a diagram illustrating the network element 411 according to one embodiment of the invention.

FIG. 8 is a diagram illustrating the network element 411 according to one embodiment of the invention. In one embodiment of the invention, the network element 411 is an access concentrator such as one of the SMS™ family of products available from Redback® Networks Inc. of San Jose, Calif. In FIG. 8, a control engine 801 is coupled with a forwarding engine 803. The control engine 801 establishes PPPoE sessions and PPPoE multicast sessions. The forwarding engine 803 encapsulates and decapsulates multicast traffic received by the network element 411. The forwarding engine 203 is coupled with input/output modules 805A-805X. The I/O modules 805A-805X process traffic to be transmitted and process traffic that has been received.

The host 401, which is illustrated in FIG. 7, and the network element 411, which is illustrated in FIG. 8, include memories, processors, and/or Application Specific Integrated Circuit ("ASICs"). Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

The present embodiments of the invention support multicasting within PPPoE without wasting an end-user's bandwidth. In addition, the present embodiments of the invention support multicasting within PPPoE with efficient use of resources of the host and the transmitting network element.

While the invention has been described in terms of several embodiments, those skilled in the art will recognize that the invention is not limited to the embodiments described. In various embodiments of the invention, the PPPoE module 780 can translate a higher layer addresses to a lower layer address (e.g., ATM, Ethernet, PPP, etc.). Furthermore, various embodiments of the invention may terminate the PPPoE multicast session at the CPE instead of the hosts.

The method and apparatus of the invention can be practiced with modification and alteration within the spirit and scope of the appended claims. The description is thus to be regarded as illustrative instead of limiting on the invention.

We claim:

1. A computer implemented method comprising:

determining a Point to Point Protocol over Ethernet (PPPoE) client to be multicast capable upon detection of a PPPoE multicast capable tag in a PPPoE active discovery request (PADR) received from the PPPoE client;

determining a layer 2 multicast address from a layer 3 multicast address;

notifying the PPPoE client of the layer 2 multicast address;

receiving multicast traffic;

encapsulating the multicast traffic with PPPoE that identifies the multicast traffic as a PPPoE multicast session; and transmitting the multicast traffic for the layer 2 multicast address as PPPoE multicast traffic in a single PPPoE multicast session from a network element to a consumer premise equipment coupled to the PPPoE client.

2. The computer implemented method of claim 1 wherein the layer 2 multicast address is an Ethernet Media Access Control (MAC) address and the layer 3 multicast address is an Internet Protocol (IP) address.

3. The computer implemented method of claim 1 wherein Point to Point Protocol over Ethernet (PPPoE) multicast traffic identifies a PPPoE multicast session identifier and the layer 2 multicast address.

4. The computer implemented method of claim 1 further comprising the Point to Point Protocol over Ethernet (PPPoE) client listening for PPPoE multicast traffic on the layer 2 multicast address.

5. The computer implemented method of claim 1 further comprising the Point to Point Protocol over Ethernet (PPPoE) client decapsulating multicast traffic from PPPoE if the PPPoE client is listening on the layer 2 multicast address.

6. A computer implemented method comprising:
determining a Point to Point Protocol over Ethernet (PPPoE) client to be multicast capable upon detection of a PPPoE multicast capable tag in a PPPoE active discovery request (PADR) received from the PPPoE client;
translating a layer 3 multicast address to a layer 2 multicast address;
receiving a multicast packet;
encapsulating the multicast packet with a Point to Point Protocol over Ethernet (PPPoE) encapsulation; and
indicating the layer 2 multicast address in the PPPoE encapsulation;
indicating a PPPoE multicast session identifier in the PPPoE encapsulation;
transmitting the PPPoE encapsulated multicast packet from a network element to a customer premise equipment coupled with a plurality of hosts as a single PPPoE multicast session as a single PPPoE multicast session.

7. The computer implemented method of claim 6 wherein the layer 2 multicast address is an Ethernet Media Access Control address.

8. The computer implemented method of claim 6 wherein the layer 3 multicast address is an Internet Protocol address.

9. The computer implemented method of claim 6 wherein the Point to Point Protocol over Ethernet (PPPoE) multicast session identifier is a reserved PPPoE session identifier.

10. The computer implemented method of claim 6 wherein the multicast packet is a video packet.

11. The computer implemented method of claim 6 wherein the multicast packet is a collaboration application packet.

12. A network element comprising:
a control engine to host a Point to Point Protocol over Ethernet (PPPoE) process, to receive a PPPoE multicast capable tag in a PPPoE active discovery request (PADR), and to translate a layer 3 multicast address to a layer 2 multicast address; and
a forwarding engine coupled with the control engine, the forwarding engine to receive a multicast packet encapsulated with a delivery protocol, to decapsulate the multicast packet from the delivery protocol encapsulation, to encapsulate the multicast packet in a PPPoE encapsulation, to indicate the layer 2 multicast address in the PPPoE encapsulation, to indicate a PPPoE multicast session identifier in the PPPoE encapsulation, and to transmit the PPPoE encapsulated multicast packet as a single PPPoE multicast session between a consumer premise equipment coupled with a plurality of hosts and the network element.

13. The network element of claim 12 wherein the control engine comprises a set of one or more processors and a memory.

14. The network element of claim 12 wherein the forwarding engine comprises a set of one or more processors and a memory.

15. The network element of claim 12 wherein the delivery protocol is Asynchronous Transfer Mode.

16. An apparatus comprising:
a network interface card to receive traffic and to listen for multicast traffic on a layer 2 multicast address;
a Point to Point Protocol over Ethernet (PPPoE) module coupled with the network interface card, the PPPoE module to indicate multicast capability with a PPPoE multicast tag in a PPPoE active discovery request (PADR), to indicate to the network interface card the layer 2 multicast address, to receive PPPoE encapsulated multicast traffic on the layer 2 multicast address from the network interface card, to decapsulate multicast traffic from PPPoE; and
a processor coupled with the PPPoE module, the processor to process multicast traffic decapsulated by the PPPoE module.

17. The apparatus of claim 16 wherein the layer 2 multicast address is an Ethernet Media Access Control address.

18. The apparatus of claim 16 wherein multicast traffic is streaming video.

19. The apparatus of claim 16 wherein multicast traffic is traffic of a collaboration application.

20. A system comprising:
a network element coupled with a consumer premise equipment (CPE) to receive a Point to Point Protocol over Ethernet (PPPoE) multicast capable tag in a PPPoE active discovery request from a plurality of hosts coupled to the CPE, to transmit notification of a multicast address, to translate the multicasts layer 3 address to a layer 2 address, to decapsulate traffic of the multicast from a first delivery protocol, to encapsulate traffic of the multicast with Point to Point Protocol over Ethernet (PPPoE), to indicate a PPPoE multicast session identifier and the layer 2 address in the multicast's PPPoE encapsulated traffic, to further encapsulate the multicast's PPPoE encapsulated traffic with a second delivery protocol, and to transmit the multicast's PPPoE encapsulated traffic as a single PPPoE multicast session to the CPE;
the CPE to decapsulate the multicast's PPPoE encapsulated traffic from the second delivery protocol and to transmit the multicast's PPPoE encapsulated traffic to each of the plurality of hosts; and
the plurality of hosts to receive the multicast's PPPoE encapsulated traffic, to determine if the host is listening for the layer 2 address indicated in the multicast's PPPoE encapsulated traffic, and to decapsulate the multicast's traffic from PPPoE if the host is listening on the indicated layer 2 address.

21. The system of claim 20 wherein the multicast is a streaming video.

22. The system of claim 20 wherein the multicast is a collaboration application.

23. The system of claim 20 wherein the layer 2 address is an Ethernet Media Access Control address.

24. The system of claim 20 wherein the layer 3 address is an Internet Protocol address.

25. The system of claim 20 wherein the Point to Point Protocol over Ethernet (PPPoE) session identifier is a reserved PPPoE session identifier.

26. The system of claim 20 further comprising a bridge coupled with the network element, the bridge to receive the multicast's Point to Point Protocol over Ethernet (PPPoE) encapsulated traffic further encapsulated with the second delivery protocol and to transmit the multicast's PPPoE encapsulated traffic further encapsulated with the second delivery protocol to the customer premise equipment (CPE).

27. A machine-readable medium that provides instructions, which when executed by a set of one or more processors, cause said set of processors to perform operations comprising:
- requesting a Point to Point Protocol over Ethernet (PPPoE) session;
- transmitting an indication of PPPoE multicast capability;
- receiving notification of a layer 3 multicast address for a multicast;
- generating a layer 2 multicast address from the layer 3 multicast address;
- receiving a packet of the multicast, the packet having a PPPoE encapsulation;
- if the PPPoE encapsulation indicates a PPPoE multicast session, then determining if the PPPoE encapsulation indicates the layer 2 multicast address;
- decapsulating the packet from the PPPoE encapsulation if the PPPoE encapsulation indicates the layer 2 multicast address; and
- discarding the packet if the PPPoE encapsulation does not indicate the layer 2 multicast address.

28. The machine-readable medium of claim 27 wherein requesting the Point to Point Protocol over Ethernet (PPPoE) session comprises transmitting a PPPoE Active Discovery Request (PADR) message to an access concentrator.

29. The machine-readable medium of claim 27 wherein the indication of Point to Point Protocol over Ethernet (PPPoE) multicast capability is a tag in a PPPoE Active Discovery Request (PADR).

30. The machine-readable medium of claim 27 wherein the Point to Point Protocol over Ethernet (PPPoE) multicast session is identified by a reserved PPPoE session identifier.

31. The machine-readable medium of claim 27 wherein the multicast is streaming audio.

32. The machine-readable medium of claim 27 wherein the multicast is streaming data for a ticker.

33. A machine-readable medium that provides instructions, which when executed by a set of one or more processors, cause said set of processors to perform operations comprising:
- determining a Point to Point Protocol over Ethernet (PPPoE) client to be multicast capable upon detection of a PPPoE multicast capable tag in a PPPoE active discovery request received from the PPPoE client;
- generating a layer 2 multicast address from a layer 3 multicast address;
- receiving a multicast packet for the layer 3 multicast address;
- encapsulating the multicast packet with a Point to Point Protocol over Ethernet (PPPoE) encapsulation;
- indicating in the PPPoE encapsulation the layer 2 multicast address and a PPPoE multicast session identifier; and
- transmitting the PPPoE encapsulated multicast packet from a network element to a consumer premise equipment coupled with a plurality of hosts as a single PPPoE multicast session.

34. The machine-readable medium of claim 33 wherein the layer 2 multicast address is an Ethernet Media Access Control address.

35. The machine-readable medium of claim 33 wherein the layer 3 multicast address is an Internet Protocol address.

36. The machine-readable medium of claim 33 wherein the Point to Point Protocol over Ethernet (PPPoE) multicast session identifier is a reserved PPPoE session identifier.

* * * * *